US00RE50877E

(19) United States
(12) Reissued Patent
Jakubowski et al.

(10) Patent Number: US RE50,877 E
(45) Date of Reissued Patent: May 5, 2026

(54) PET CARRIER

(71) Applicant: Vermont Juvenile Furniture Mfg., Inc., West Rutland, VT (US)

(72) Inventors: Chris Jakubowski, Rutland, VT (US); Todd M. Jakubowski, Rutland, VT (US); Kristen Jakubowski, Rutland, VT (US)

(73) Assignee: Vermont Juvenile Furniture MFg., Inc.

(21) Appl. No.: 30/005,876

(22) Filed: May 29, 2025

Related U.S. Patent Documents

Reissue of:

(64) Patent No.: Des. 1,045,239
Issued: Oct. 1, 2024
Appl. No.: 29/948,471
Filed: Jun. 21, 2024

U.S. Applications:

(60) Continuation of application No. 29/878,873, filed on Jun. 28, 2023, now Pat. No. Des. 1,035,167, which is a division of application No. 29/785,128, filed on May 24, 2021, now Pat. No. Des. 996,732, which is a division of application No. 29/684,215, filed on Mar. 19, 2019, now Pat. No. Des. 923,256.

(51) LOC (15) Cl. ..... 30-02

(52) U.S. Cl.
USPC ..... D30/109

(58) Field of Classification Search
USPC ..... D30/108, 109, 150; D12/129; D3/213, D3/216, 246
CPC ..... A01K 1/0254; A45C 3/00; A45C 13/30; B62B 5/0013; B62B 9/26; B62B 9/12; B62B 9/214
See application file for complete search history.

(56) References Cited

U.S. PATENT DOCUMENTS 1,143,774 A 6/1915 Nicholls
1,623,259 A 4/1927 McGregor et al.
2,365,003 A 12/1944 Reinholz
2,621,358 A 12/1952 Chrisman
3,116,069 A 12/1963 Dostal
3,159,850 A 12/1964 Aldrich
3,349,413 A 10/1967 Merlis
3,741,579 A 6/1973 Kirsch
4,412,688 A 11/1983 Giordani
4,481,685 A 11/1984 Watson
4,707,024 A 11/1987 Schrader
4,836,573 A 6/1989 Gebhard
D308,656 S 6/1990 Takahashi et al.
5,074,575 A 12/1991 Bigo
5,201,535 A 4/1993 Kato
5,203,577 A 4/1993 Kato et al.
D344,701 S 3/1994 Church
5,479,892 A 1/1996 Edwards
5,524,965 A 6/1996 Barley
5,553,885 A 9/1996 Cheng
5,772,279 A 6/1998 Johnson, Jr.
D398,083 S * 9/1998 Martz ..... D3/273
6,139,046 A 10/2000 Aalund et al.
D438,731 S 3/2001 Brown et al.
6,223,691 B1 5/2001 Beattie
D445,965 S 7/2001 Licciardello
D445,966 S * 7/2001 Licciardello ..... D30/109
D453,593 S 2/2002 Licciardello
D463,329 S * 9/2002 Yang ..... D12/129
D469,929 S 2/2003 Licciardello
D475,660 S 6/2003 Licciardello
6,584,937 B1 7/2003 Ludolph
6,594,840 B2 7/2003 Tomas et al.
6,755,435 B2 6/2004 Hsia
7,090,242 B1 * 8/2006 Sheinall ..... A01K 1/0245 280/657
7,568,450 B2 8/2009 Chen
D608,505 S * 1/2010 Lin ..... D30/109
7,665,421 B2 2/2010 Martz
D646,208 S 10/2011 Ohnishi et al.
8,651,502 B2 2/2014 Winterhalter et al.
D707,896 S * 6/2014 Renforth ..... D30/108
D708,399 S 7/2014 Lipscomb
D713,605 S 9/2014 Lipscomb
D723,746 S * 3/2015 Jakubowski ..... D30/109
9,108,659 B2 8/2015 Sparling
D757,370 S 5/2016 Jakubowski
D801,592 S 10/2017 Jakubowski
D804,280 S 12/2017 Atkinson, Jr.
D815,568 S 4/2018 Oakes
D826,794 S 8/2018 Walker et al.
D827,939 S 9/2018 Jakubowski
D836,498 S 12/2018 Hauser et al.
D849,607 S 5/2019 Tomasi
D855,899 S 8/2019 Jakubowski
D856,602 S 8/2019 Lu
D869,099 S 12/2019 Lu
D874,987 S 2/2020 Baker et al.
D875,619 S 2/2020 Conley (AMENDED)

| | | | | | |
|---|---|---|---|---|---|
| D878,249 | S | | 3/2020 | Pos | |
| D882,184 | S | | 4/2020 | Jakubowski | |
| D883,860 | S | | 5/2020 | Barenbrug | |
| D886,535 | S | | 6/2020 | Zemel | |
| 10,667,489 | B2 | | 6/2020 | Jakubowski et al. | |
| D889,323 | S | | 7/2020 | Reinius et al. | |
| D891,993 | S | | 8/2020 | Altenhofen et al. | |
| D893,359 | S | | 8/2020 | Holleis et al. | |
| D897,909 | S | | 10/2020 | Xiang | |
| D899,006 | S | | 10/2020 | Chen | |
| D906,900 | S | | 1/2021 | Walker et al. | |
| D915,247 | S | | 4/2021 | Haley et al. | |
| D920,588 | S | | 5/2021 | Chen | |
| D923,256 | S | | 6/2021 | Jakubowski | |
| D926,639 | S | | 8/2021 | Hauser et al. | |
| D930,262 | S | | 9/2021 | Chaudhry | |
| D950,425 | S | * | 5/2022 | Lin | D12/129 |
| D955,060 | S | | 6/2022 | Wu | |
| D955,301 | S | * | 6/2022 | Lin | D12/129 |
| D960,770 | S | | 8/2022 | Jakubowski | |
| D982,838 | S | | 4/2023 | Han | |
| D988,611 | S | | 6/2023 | Pang | |
| D991,576 | S | | 7/2023 | Yu | |
| D993,542 | S | | 7/2023 | Pang | |
| D996,733 | S | | 8/2023 | Yu | |
| D1,000,001 | S | * | 9/2023 | Lu | D30/109 |
| D1,000,717 | S | * | 10/2023 | Lu | D30/109 |
| D1,003,530 | S | * | 10/2023 | Tu | D12/129 |
| D1,003,531 | S | * | 10/2023 | Tu | D12/129 |
| D1,004,209 | S | * | 11/2023 | Chen | D30/109 |
| D1,007,770 | S | | 12/2023 | Pang | |
| D1,026,741 | S | | 5/2024 | Jakubowski et al. | |
| D1,035,167 | S | | 7/2024 | Jakubowski et al. | |
| D1,045,239 | S | | 10/2024 | Jakubowski et al. | |
| D1,063,232 | S | | 2/2025 | Jakubowski et al. | |
| 2006/0169218 | A1 | | 8/2006 | Fong | |
| 2008/0012408 | A1 | | 1/2008 | Santamaria | |
| 2011/0056441 | A1 | | 3/2011 | Chang | |
| 2011/0278810 | A1 | | 11/2011 | Winterhalter et al. | |
| 2013/0113185 | A1 | | 5/2013 | Zehfuss | |
| 2014/0159358 | A1 | | 6/2014 | Chen et al. | |
| 2014/0230747 | A1 | | 8/2014 | Jakubowski | |
| 2014/0333106 | A1 | | 11/2014 | Chen | |
| 2015/0076774 | A1 | | 3/2015 | Sclare | |
| 2018/0022371 | A1 | | 1/2018 | Jakubowski et al. | |
| 2018/0043917 | A1 | | 2/2018 | Plested et al. | |
| 2018/0132446 | A1 | | 5/2018 | Jakubowski et al. | |
| 2019/0002007 | A1 | | 1/2019 | Yuanzhen | |
| 2019/0053462 | A1 | | 2/2019 | Lin | |
| 2020/0236895 | A1 | | 7/2020 | Cheung | |
| 2020/0247453 | A1 | | 8/2020 | Gibson et al. | |
| 2020/0296919 | A1 | | 9/2020 | Jakubowski | |
| 2020/0353967 | A1 | * | 11/2020 | Horst | B62B 9/20 |
| 2021/0022314 | A1 | | 1/2021 | Xiang | |
| 2022/0297737 | A1 | * | 9/2022 | Horst | B62B 9/26 |
| 2023/0397570 | A1 | | 12/2023 | Cheng | |
| 2024/0067252 | A1 | * | 2/2024 | Zhong | B62B 9/102 |
| 2024/0075976 | A1 | * | 3/2024 | Jablonski | B60N 2/2848 |
| 2025/0151692 | A1 | | 5/2025 | Jakubowski et al. | |

FOREIGN PATENT DOCUMENTS

| | | | |
|---|---|---|---|
| CN | 102190012 | A | 9/2011 |
| CN | 103407466 | A | 11/2013 |
| CN | 203876796 | U | 10/2014 |
| CN | 105882721 | A | 8/2016 |
| CN | 206005460 | U | 3/2017 |
| CN | 304827458 | S | 9/2018 |
| CN | 208113692 | | 11/2018 |
| CN | 208149362 | U | 11/2018 |
| CN | 305009287 | S | 1/2019 |
| GB | 2511200 | A | 8/2014 |
| JP | 2006254801 | A | 9/2006 |
| JP | 3133057 | U | 6/2007 |
| JP | 2007185180 | A | 7/2007 |
| JP | 2009247278 | A | 10/2009 |
| JP | 201507700 | A | 6/2015 |
| JP | 2013123413 | A | 6/2015 |
| JP | 2018023324 | A | 2/2018 |
| KR | 300955312 | | 4/2018 |

OTHER PUBLICATIONS

YouTube video "HPZ Pet Rover Prime Complete Assembly" HPZ Pet Rover, published Nov. 8, 2018, https://www.youtube.com/watch?v=I_61dDriw6c.

HPZ PetRover USA, 3-in-1 Pet Travel System, New 2019 Model, 6 pgs.

Utopian pet four wheel pet stroller, Jan. 2019 (date reference was first known to the undersigned), https://lots-of-pets.myshopify.com/products/utopian-pet-four-wheel-pet-stroller-color-olive (cited in parent).

Ibiyaya elegant retro I, Jan. 2019 (date reference was first known to the undersigned), https://www.amazon.com/ibiyaya-FS1202-NB-Elegant-Retro-Stroller/dp/B00M1OAUEE.

Paws & Pals 4 Wheel 2-In-1 Stroller & Carrier, Jan. 2019 (date reference was first known to the undersigned), https://www.chewy.com/paws-pals-2-in-1-detachable-dog-cat/dp/217526.

Aosom Elite—Jr Dog Pet Bike Trailer / Stroller with Swivel Wheel—Red / Black, Jan. 2019 (date reference was first known to the undersigned), https://www.aosom.com/item/aosom-elite-jr-dog-pet-bike-trailer-stroller-w-swivel-wheel-red-black-5663-1334R-B.html.

* cited by examiner

*Primary Examiner* — Philip S Hyder
(74) *Attorney, Agent, or Firm* — Volpe Koenig

(57) CLAIM

The ornamental design for a pet carrier, as shown and described.

DESCRIPTION

FIG. 1 is a top, front, right perspective view of a pet carrier showing our new design,
FIG. 2 is a front elevational view thereof;
FIG. 3 is a rear elevational view thereof;
FIG. 4 is a left side elevational view thereof;
FIG. 5 is a right side elevational view thereof;
FIG. 6 is a top plan view thereof; and,
FIG. 7 is a bottom view thereof.
The broken lines shown in the drawings illustrate portions of the pet carrier that form no part of the claimed design.

1 Claim, 7 Drawing Sheets

Matter enclosed in heavy brackets [ ] appears in the original patent but forms no part of this reissue; matter printed in italics indicates the additions made by reissue.

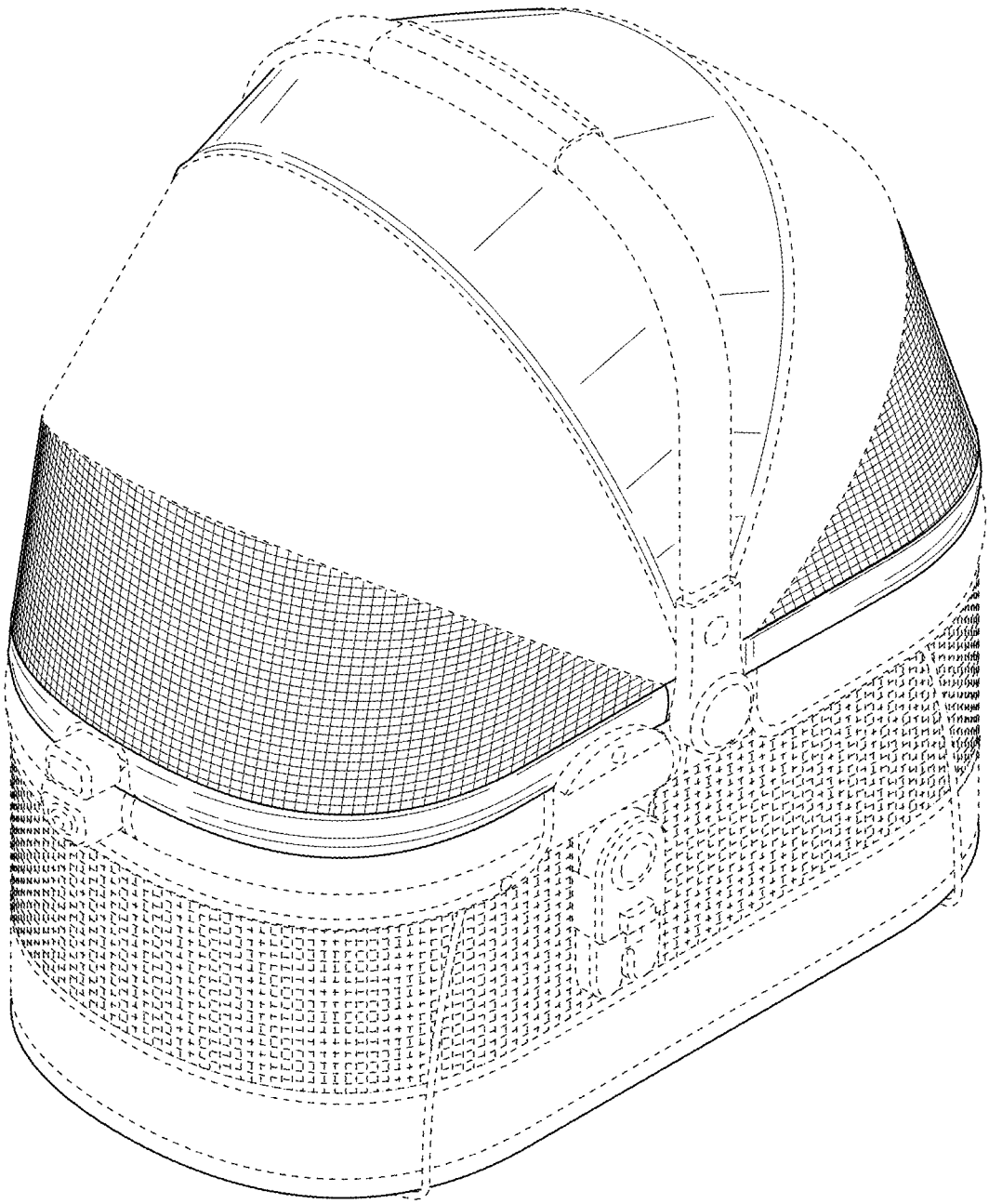
FIG. 1
(AMENDED)

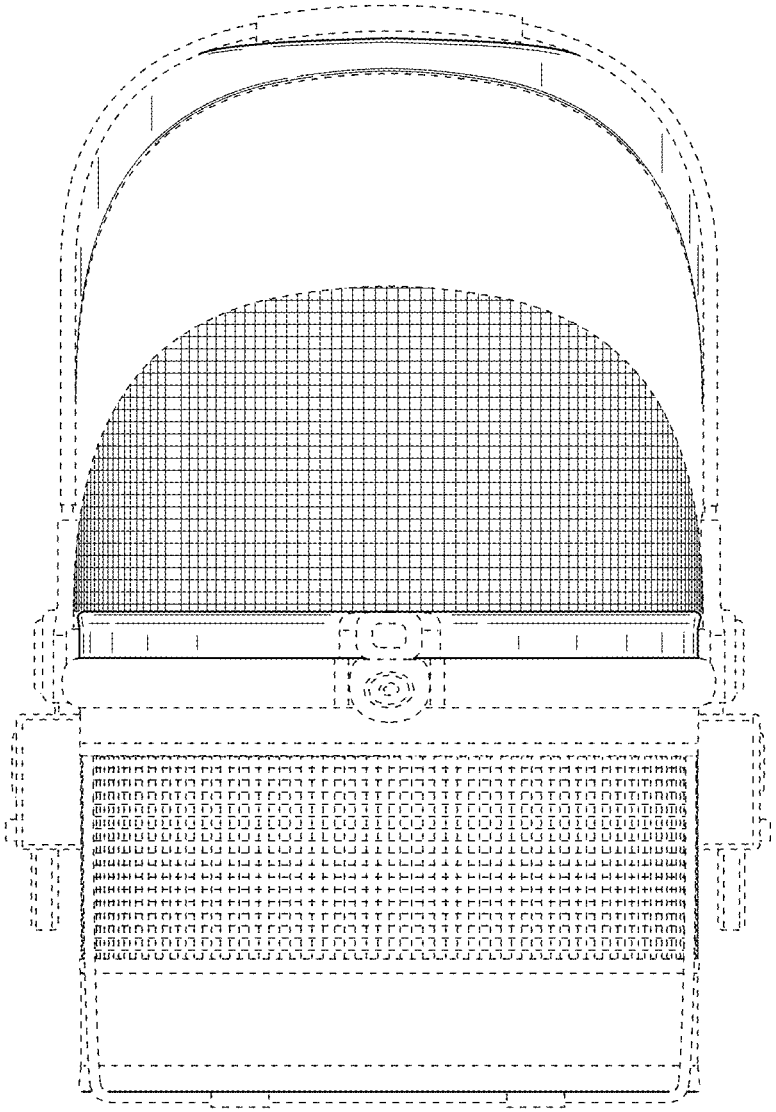
FIG. 2
(AMENDED)

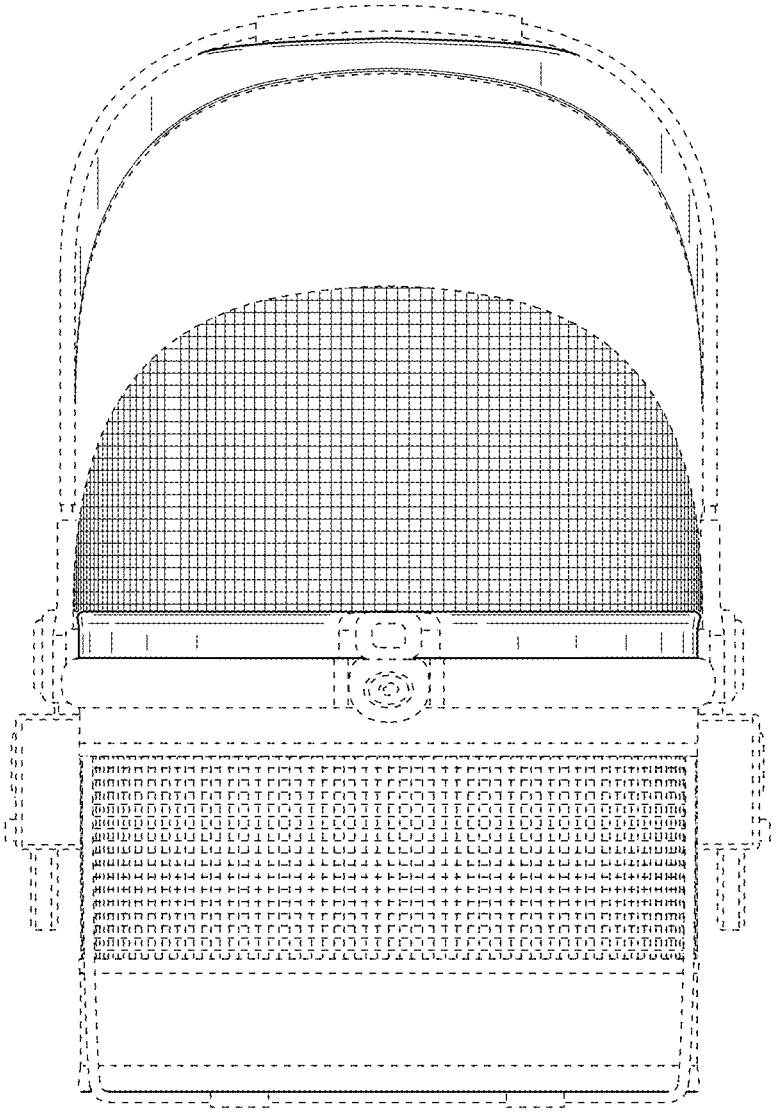
FIG. 3
(AMENDED)

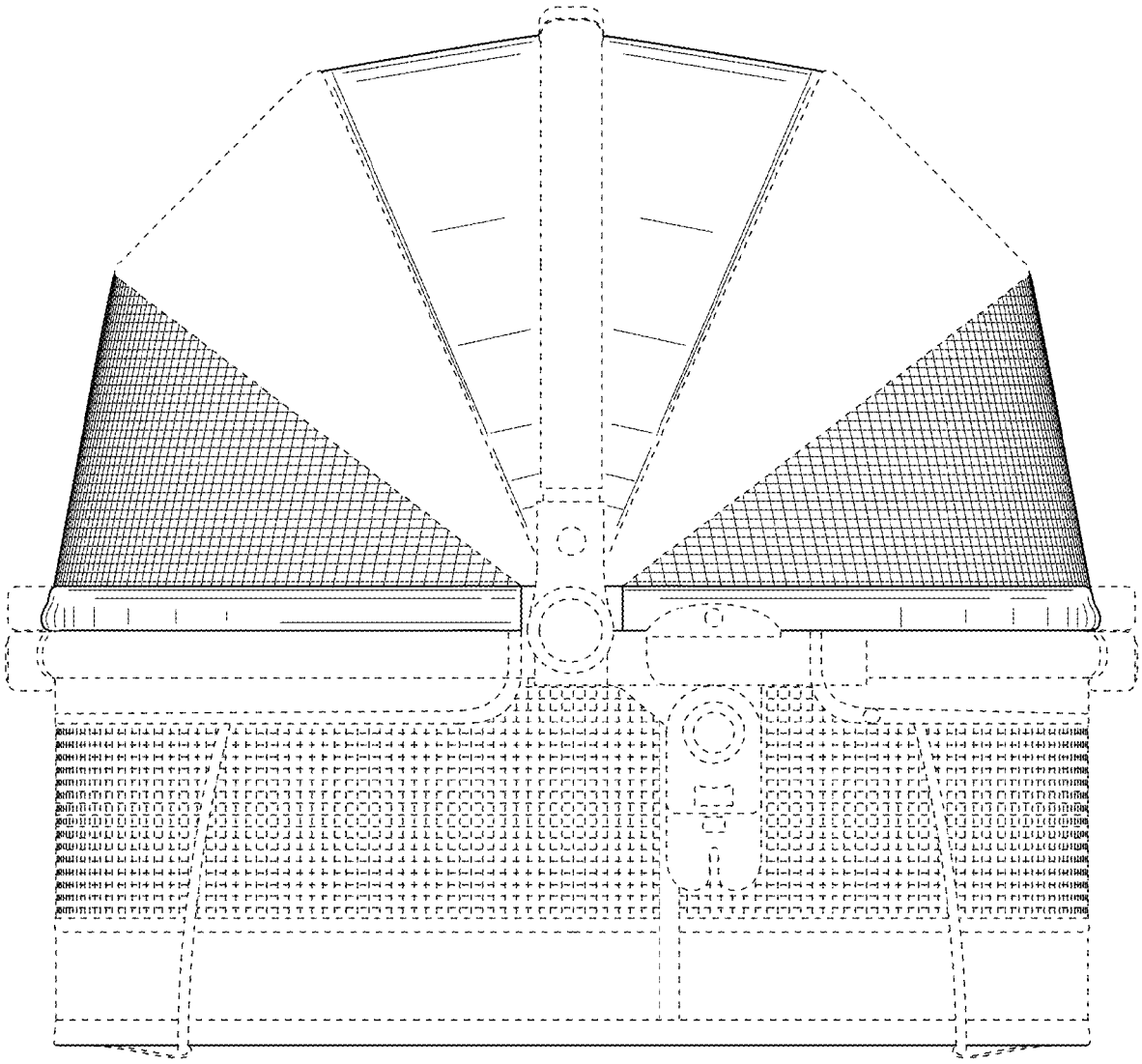
FIG. 4
(AMENDED)

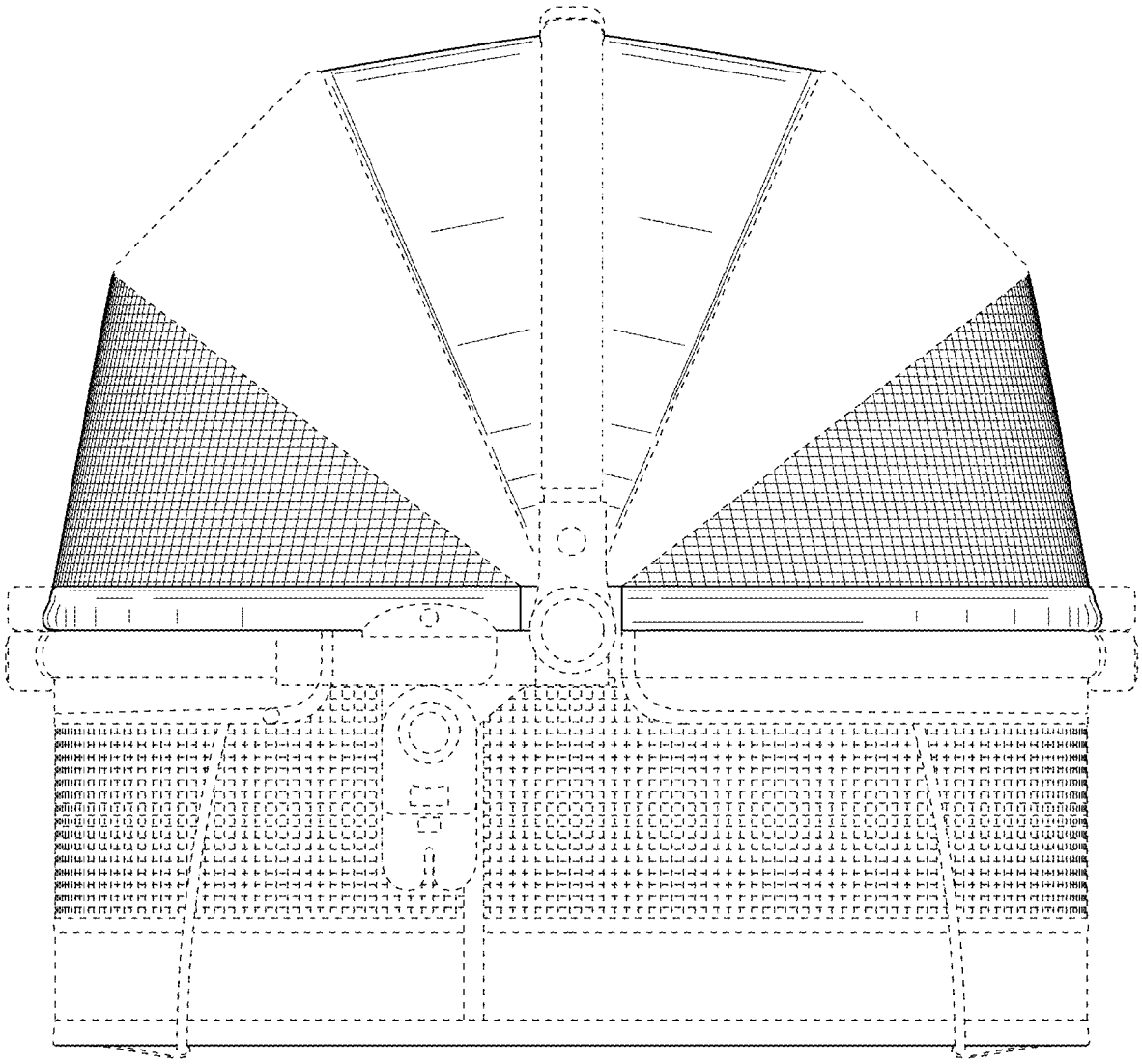
FIG. 5
(AMENDED)

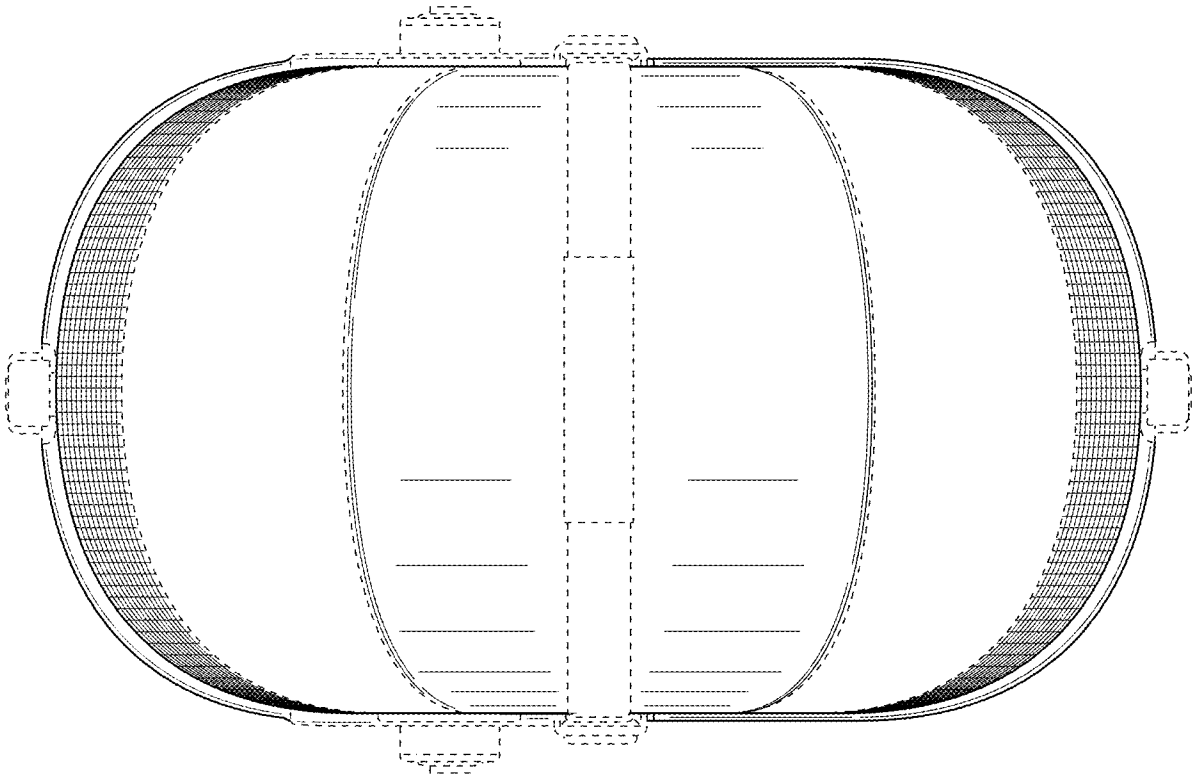
FIG. 6
(AMENDED)

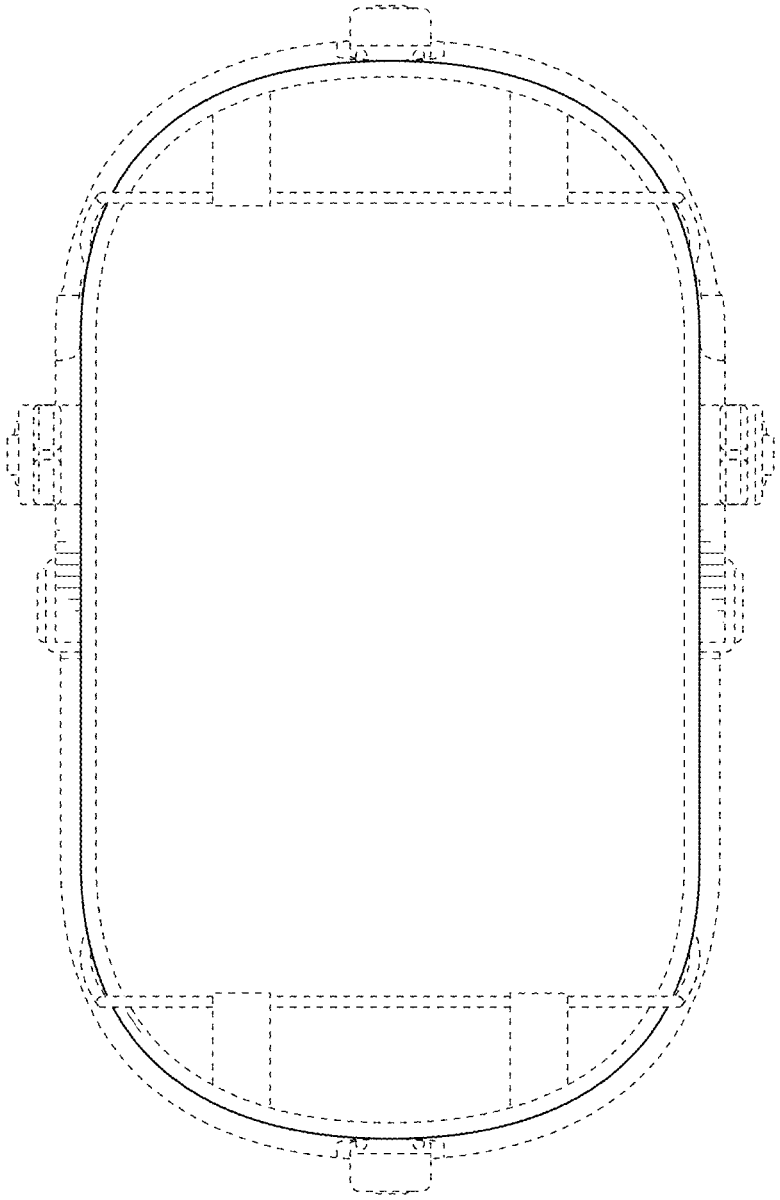
FIG. 7
(AMENDED)